United States Patent Office 3,431,254
Patented Mar. 4, 1969

3,431,254
MODIFIED HYDROXYPROPYL CELLULOSE
AND PROCESS
Eugene D. Klug, Wilmington, Del., assignor to Hercules
Incorporated, a corporation of Delaware
No Drawing. Filed Mar. 24, 1966, Ser. No. 542,178
U.S. Cl. 260—231            13 Claims
Int. Cl. C08b 11/14, 11/00

ABSTRACT OF THE DISCLOSURE

As a new compound (and process of preparing) the reaction product of cellulose, propylene oxide and amino alkylation agent. The process is carried out in the presence of aqueous alkali.

The present invention relates to improved products and process of preparing, and more particularly to the water soluble reaction product of (1) cellulose, (2) propylene oxide, and (3) an aminoalkylating agent and to the process of preparing such a product.

My copending application Ser. No. 257,064, now U.S. Patent No. 3,278,521 describes and claims a novel hydroxypropyl cellulose and process of preparing. Surprisingly, the hydroxypropyl cellulose of said copending application has the following desirable characteristics:

(1) Soluble in cold water.
(2) Insoluble in hot water.
(3) Thermoplastic.
(4) Soluble in a large number of polar organic solvents.
(5) Low equilibrium moisture content.

Insolubility in hot water is a very desirable characteristic from a process standpoint because it enables purification of the product with water instead of much more expensive organic materials, however this property is a disadvantage in that it rules out those uses where the product must remain in solution at an elevated temperature. Furthermore, in several of these uses the product must remain in solution at a low pH as well as at an elevated temperature.

Obviously then, it would be highly desirable to provide a product which (a) possesses as many as possible of the desirable properties of 1, 3, 4 and 5 above, (b) is soluble in hot water at a low pH, (c) is insoluble in hot, water at a high pH.

It has been found in accordance with the persent invention that a product having the properties set forth in the immediately preceding paragraph is obtained by reacting together in the presence of aqueous alkali (1) cellulose, (2) propylene oxide, and (3) a compound (sometimes referred to hereinafter as an "aminoalkylation agent") having the formula

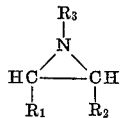

wherein $R_1$ and $R_2$ each represents a member selected from the group consisting of the hydrogen atom, the methyl- and ethyl radicals and wherein $R_3$ represents a member selected from the group consisting of the hydrogen atom, the methyl-, ethyl-, phenethyl-, amino-, ethyl-, cyanoethyl-, hydroxyethyl-, hydroxypropyl-, acetyl-, and —$COOC_2H_5$ radicals.

Where the $R_1$, $R_2$ and $R_3$ in the above formula are each hydrogen, the compound is ethylenimine. For the sake of clarity and convenience, and because ethylenimine is a typical aminoalkylation agent for use in the present invention, hereinafter the present invention will be described for the most part with reference to ethylenimine.

In view of the prior art, applicant was quite surprised to discover that this reaction took place. The prior art teaches that bases such as sodium hydroxide and potassium hydroxide do not open the ethylenimine ring; in fact, ethylenimine is stored over sodium hydroxide or potassium hydroxide pellets to inhibit its polymerization. Fournier (Ann. chim. 7, 75–127, 1952, CA 47, 1611d) was unable to get reaction between ethylenimine and alkali cellulose made from 30% sodium hydroxide. Montegudet (Compt. rend. 242, 1988–2000, 1956, CA 50, 11662a) was unable to get reaction between ethylenimine and cellulose or between ethylenimine and hydroxyethyl cellulose even at temperatures as high as 100° C. Using conditions substantially the same as those of the present invention, including an aqueous alkaline reaction medium containing a diluent, neither was applicant able to get any appreciable reaction (1) between ethylenimine and cellulose, (2) between ethylenimine and hydroxyethyl cellulose, or (3) between ethylenimine, ethylene oxide and cellulose.

The following examples illustrate various ways of carrying out the present invention, but these examples are not intended to limit the invention beyond the scope of the appended claims. In the examples and elsewhere herein, unless otherwise indicated, percent, parts and ratios are by weight and all viscosities were determined with a standard Brookfield Synchro-Lectric LVF viscometer using aqueous solutions of the cellulose derivative product of the concentrations specified and at 25° C. The aminoethyl molecular substitution (M.S.) of the products was calculated from the nitrogen content determined by the Kjeldahl method, and the hydroxypropyl M.S. was determined by the terminal methyl method. The terminal methyl method is reported by Lemieux and Purves, beginning at page 485, vol. 25B, 1947, of Canadian Journal of Research.

In these examples the measure of the hot water solubility of the cellulose derivative products was obtained from the opaque temperature. This value for the opaque temperature was obtained by raising the temperature of a 2% aqueous solution of the product at the rate of 1° C.–2° C. per minute. This was done in a test tube in which a thermometer was immersed. The lowest temperature at which the solution became opaque was recorded as the opaque temperature.

The following procedure was used in Examples 1–11 hereinafter.

A mixture of 1 part cellulose (cotton linters), 0.1 part NaOH, 0.4 part water, 2 parts tertiary butyl alcohol and 9 parts heptane was stirred for one hour. Then 3 parts propylene oxide and the indicated amount of ethylenimine (Tables 1 and 2 hereinafter) were added and the mixture heated at elevated pressure and 70° C. for 16 hours. The reaction mixture was then cooled and the excess liquor filtered off. Steam was passed through the filter cake to drive off residual heptane. The filter cake was then stirred in hot water (about 90° C.) and the pH was decreased to about 9 with 85% $H_3PO_4$. The product was thoroughly washed with hot water (about 90° C.) and dried at about 120° C. The product had a hydroxypropyl M.S. of approximately 4 and the aminoethyl M.S. indicated (Tables 1 and 2 hereinafter). Further details appear in Tables 1 and 2 hereinafter.

TABLE 1.—EFFECT OF AMINOETHYL M.S. ON HOT WATER SOLUBILITY AT pH 3, 7 AND 9

| | Aminoethyl[1] M.S. | Ethylenimine/ Cellulose ratio | Visc. 2% cps. | Opaque Temp., °C.[2] | | |
|---|---|---|---|---|---|---|
| | | | | 9 | pH 7 | 3 |
| Example: | | | | | | |
| 1 | 0 (Control) | 0 | 150 | 43 | 43 | 40 |
| 2 | 0.075 | 0.030 | 188 | 43 | 45 | 88 |
| 3 | 0.08 | 0.042 | 142 | 43 | 55 | >95 |
| 4 | 0.16 | 0.085 | 168 | 42 | 82 | >95 |
| 5 | 0.40 | 0.21 | 134 | 42 | >95 | >95 |
| 6 | 0.89 | 0.635 | 161 | 43 | >95 | >95 |
| 7 | 1.02 | 0.85 | 44 | 43 | >95 | >95 |

[1] The hydroxypropyl M.S. was 4.0 in all examples.
[2] Not opaque at 95° C., the maximum temperature of the test, is the meaning of all ">95° C." values.

TABLE 2.—EFFECT OF AMINOETHYL M.S. ON HOT WATER SOLUBILITY AT pH 2-10

| | Aminoethyl[1] M.S. | Ethylenimine/ Cellulose ratio | Opaque Temp., °C.[2] | | | | | | | | |
|---|---|---|---|---|---|---|---|---|---|---|---|
| | | | pH | | | | | | | | |
| | | | 2 | 3 | 4 | 5 | 6 | 7 | 8 | 9 | 10 |
| Example: | | | | | | | | | | | |
| 8 | 0 (Control) | 0 | 40 | 40 | 40 | 40 | 43 | 43 | 43 | 43 | 43 |
| 9 | 0.08 | 0.042 | >95 | 95 | 95 | 95 | 84 | 59 | 46 | 43 | 43 |
| 10 | 0.16 | 0.085 | >95 | 95 | 95 | 95 | 95 | 75 | 49 | 43 | |
| 11 | 0.40 | 0.021 | >95 | 95 | 95 | 95 | 95 | 95 | 53 | 41 | |

[1] The hydroxypropyl M.S. was approximately 4 in all examples.
[2] Not opaque at 95° C. temperature of the test is the meaning of all ">95° C." values.

The data in Table 1 show the effect of aminoethyl M.S. on hot water solubility as measured by opaque temperature over a wide aminoethyl M.S. range (0.075–1.02) and at representative pH levels (pH 3, 7 and 9), whereas the data in Table 2 gives the same type picture for an aminoethyl M.S. range in the middle of the above range over the above broad pH range and at several intermediate pH values.

From the data in Tables 1 and 2 hereinbefore it is readily apparent that as the aminoethyl M.S. increases (1) the temperature at which the product is soluble in hot water substantially increases even at a very low pH of 2 (and this would also apply at lower pH values), and (2) the pH at which the product remains soluble in hot water is also increased. The effect of aminoethyl M.S. on hot water solubility is the most rapid at the lower pH range of 2–6, starts decreasing in rapidity at pH 6 and is substantially nil at pH 9.

Thus an outstanding advantage of the present invention is that it provides a product which has excellent hot water solubility over a wide pH range and yet which is insoluble in hot water at a high pH. The former property is quite beneficial in uses of the product and the latter property is quite beneficial in the purification of the product. For instance, the product is particularly suitable for those uses in which it must remain in solution at elevated temperature and at pH's of about 7 and below. These include such uses e.g. as some processes of separating solids from liquids wherein a flocculant is used to aid in the separation. At the same time the product is especially attractive because it is insoluble in hot water at an elevated pH (e.g. about pH 8 or 9 and above) and therefore can be very inexpensively purified during preparation simply by hot water washing.

In addition to providing a product of greatly improved hot water solubility properties, the process of the present invention also substantially increases the thermoplasticity of the product. The effect of aminoethyl M.S. on thermoplasticity was determined as follows under the application of heat and pressure in an Olsen Bakelite flow tester. This is a standard testing device widely used in the plastics industry. It is described in ASTM method D569–46A (ASTM Standards, 1958, part 9, page 393). This device is perhaps more often referred to in the art as the Tinius Olsen flow tester. The product was ground to a fine powder and conditioned over $CaCl_2$ and therefore was substantially bone dry when tested. Cylindrical pellets ⅜" x ⅜" were formed from this powder in a pelleting machine. The pellet was placed in the Tinius Olsen flow tester and the plastic flow thereof measured under the conditions shown in Table 3 hereinafter. The products in Table 3 on which thermoplastic flow properties were determined were prepared under the same conditions set forth hereinbefore for preparing the products of Examples 1–11.

TABLE 3.—THERMOPLASTIC FLOW

| | Aminoethyl M.S.[1] | Flow at 500 p.s.i. and 120° C., in./2 min. |
|---|---|---|
| Example: | | |
| 12 | 0 (Control) | 0.11 |
| 13 | 0.12 | 0.40 |
| 14 | 0.15 | 0.48 |
| 15 | 0.19 | 0.86 |
| 16 | 0.23 | 0.94 |
| 17 | 0.37 | 1.07 |

[1] The hydroxypropyl M.S. was approximately 4 in all examples.

Another important and unexpected property of the products of the present invention is the temperature-viscosity relationships of aqueous solutions thereof. This relationship may be studied by means of the Brabender Viscoamylograph which records the viscosity continuously as the temperature is raised from 25° C. to 97° C. at the rate of 1.5° C. per minute. With hydroxypropyl cellulose there is a normal decrease in viscosity as the temperature increases followed by an abrupt disappearance of viscosity at about 40° C.–45° C., the temperature at which precipitation occurs. In contrast to this, particularly at the lower pH levels, the temperature-viscosity curve of the products of the present invention will have the following behavior. As the temperature is raised, there is first a drop in viscosity such as normally occurs with high molecular weight polymer solutions. However, at some intermediate temperature (e.g. in the range of about 50° C.–70° C.) the viscosity increases, and at the temperature range of 60° C.–80° C. the viscosity is much greater than at room temperature. While these curves on the products of the present invention will usually go through maximum and then the viscosity will fall off, in many cases at a temperature of about 97° C. (the highest temperature in the tests) the viscosity is still substantially higher than at room temperature. Of course these temperature-viscosity curves are somewhat dependent on such properties as substitution values, pH and initial viscosity of the product.

Various other reactants were employed in accordance with the present invention to take the place of ethylenimine and they gave products having substantially the improved properties disclosed hereinbefore. The conditions employed in preparing and testing these products were substantially the same as those employed regarding the foregoing examples. Table 4 hereinafter gives further details.

above-identified copending application, unless otherwise specifically indicated herein, are applicable in the process of the present case.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:
1. As a new composition of matter, the reaction product

TABLE 4.—VARIOUS REACTANTS

| Example | Reactant Name | Formula | Reactant/Cellulose ratio | Aminoethyl [1] M.S. | Opaque Temp., °C.[2] | | |
|---|---|---|---|---|---|---|---|
| | | | | | 9 | pH 7 | 3 |
| 18 | N-(2-hydroxyethyl)aziridine | NCH$_2$CH$_2$OH / H$_2$C——CH$_2$ | 0.05 | 0.067 | 43 | 48 | 55 |
| 19 | do | NCH$_2$CH$_2$OH / H$_2$C——CH$_2$ | 0.10 | 0.073 | 42 | 53 | >95 |
| 20 | do | NCH$_2$CH$_2$OH / H$_2$C——CH$_2$ | 0.20 | 0.23 | 43 | 88 | >95 |
| 21 | N-(2-aminoethyl)aziridine | NCH$_2$CH$_2$NH$_2$ / H$_2$C——CH$_2$ | 0.05 | 0.043 | 44 | 79 | >95 |
| 22 | do | NCH$_2$CH$_2$NH$_2$ / H$_2$C——CH$_2$ | 0.10 | 0.091 | 46 | >95 | >95 |
| 23 | do | NCH$_2$CH$_2$NH$_2$ / H$_2$C——CH$_2$ | 0.25 | 0.22 | 46 | >95 | >95 |
| 24 | N-ethyl aziridine | NC$_2$H$_5$ / H$_2$C——CH$_2$ | 0.10 | 0.063 | 44 | 61 | 75 |
| 25 | N-phenethyl aziridine | NCH$_2$CH$_2$C$_6$H$_5$ / H$_2$C——CH$_2$ | 0.10 | 0.029 | 44 | 44 | 46 |
| 26 | do | NCH$_2$CH$_2$C$_6$H$_5$ / H$_2$C——CH$_2$ | 0.25 | 0.034 | 38 | 61 | 85 |
| 27 | N-(2-cyanoethyl)aziridine | NCH$_2$CH$_2$CN / H$_2$C——CH$_2$ | 0.10 | 0.064 | 44 | 55 | 81 |
| 28 | 1,2-propyleneimine | NH / CH$_3$—CH——CH$_2$ | 0.05 | 0.014 | 43 | 45 | 69 |
| 29 | do | NH / CH$_3$—CH——CH$_2$ | 0.10 | 0.037 | 42 | 48 | 88 |

[1] The hydroxypropyl M.S. was approximately 4 in all examples. [2] Not opaque at 95° C., the maximum temperature of the test, is the meaning of all ">95° C." values.

Because of the fact that chaining out is possible in the products of this invention, theoretically there is no limitation to the maximum hydroxypropyl substitution value and the maximum aminoalkyl substitution value. The aminoalkyl substitution values normally employed will be about 0.01–3.0, preferably 0.05–1.0. The hydroxypropyl substitution values employed are the same as those in my above-identified copending application. That is, the hydroxypropyl M.S. must be at least 2, preferably 3–10, 4 being specifically preferred.

Analysis of the products of the present invention has shown that the nitrogen is present as tertiary amine. It is well known that tertiary amines may be quaternized by treatment with reagents such as methyl iodide or dimethyl sulfate. The quaternary salts of the products of the present invention show good hot water solubility over the entire pH range (i.e. 2 and below and up to about 10).

The various other process conditions set forth in my above-identified copending application, unless otherwise specifically indicated herein, are applicable in the process of the present case.

of (1) cellulose, (2) propylene oxide, and (3) a compound having the formula

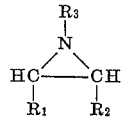

wherein R$_1$ and R$_2$ each represents a member selected from the group consisting of the hydrogen atom, the methyl- and ethyl radicals and wherein R$_3$ represents a member selected from the group consisting of the hydrogen atom, the methyl-, ethyl-, phenethyl-, aminoethyl-, cyanoethyl-, hydroxyethyl-, hydroxypropyl-, acetyl-, and —COOC$_2$H$_5$ radicals, said reaction taking place in the presence of aqueous alkali and said reaction product having a hydroxypropyl M.S. of at least 2 and an aminoalkyl M.S. of about 0.01–3.0.

2. As a new composition of matter, the quaternized reaction product of (1) cellulose, (2) propylene oxide, and (3) a compound having the formula

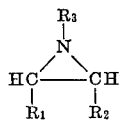

wherein $R_1$ and $R_2$ each represents a member selected from the group consisting of the hydrogen atom, the methyl- and ethyl radicals and wherein $R_3$ represent a member selected from the group consisting of the hydrogen atom, the methyl-, ethyl-, phenethyl-, aminoethyl-, cyanoethyl-, hydroxyethyl-, hydroxypropyl-, acetyl-, and —$COOC_2H_5$ radicals, said reaction taking place in the presence of aqueous alkali and said reaction product having a hydroxypropyl M.S. of at least 2 and an aminoalkyl M.S. of about 0.01–3.0.

3. As a new composition of matter, the reaction product of (1) cellulose, (2) propylene oxide, and (3) a compound having the formula

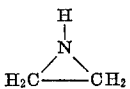

said reaction taking place in the presence of aqueous alkali and said reaction product having a hydroxypropyl M.S. of at least 2 and an aminoalkyl M.S. of about 0.01–3.0.

4. As a new composition of matter, the reaction product of (1) cellulose, (2) propylene oxide, and (3) a compound having the formula

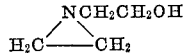

said reaction taking place in the presence of aqueous alkali and said reaction product having a hydroxypropyl M.S. of at least 2 and an aminoalkyl M.S. of about 0.01–3.0.

5. As a new composition of matter, the reaction product of (1) cellulose, (2) propylene oxide, and (3) a compound having the formula

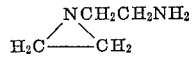

said reaction taking place in the presence of aqueous alkali and said reaction product having a hydroxypropyl M.S. of at least 2 and an aminoalkyl M.S. of about 0.01–3.0.

6. As a new composition of matter, the reaction product of (1) cellulose, (2) propylene oxide, and (3) a compound having the formula

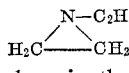

said reaction taking place in the presence of aqueous alkali and said reaction product having a hydroxypropyl M.S. of at least 2 and an aminoalkyl M.S. of about 0.01–3.0.

7. As a new composition of matter, the reaction product of (1) cellulose, (2) propylene oxide, and (3) a compound having the formula

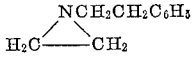

said reaction taking place in the presence of aqueous alkali and said reaction product having a hydroxypropyl M.S. of at least 2 and an aminoalkyl M.S. of about 0.01–3.0.

8. As a new composition of matter, the reaction product of (1) cellulose, (2) propylene oxide, and (3) a compound having the formula

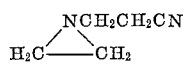

said reaction taking place in the presence of aqueous alkali and said reaction product having a hydroxypropyl M.S. of at least 2 and an aminoalkyl M.S. of about 0.01–3.0.

9. As a new composition of matter, the reaction product of (1) cellulose, (2) propylene oxide, and (3) a compound having the formula

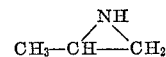

said reaction taking place in the presence of aqueous alkali and said reaction product having a hydroxypropyl M.S. of at least 2 and an aminoalkyl M.S. of about 0.01–3.0.

10. Process of preparing a water soluble product having improved properties, which process comprises reacting together in the presence of aqueous alkali (1) cellulose, (2) propylene oxide, and (3) a compound having the formula

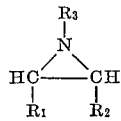

wherein $R_1$ and $R_2$ each represents a member selected from the group consisting of the hydrogen atom, the methyl- and ethyl radicals and wherein $R_3$ represents a member selected from the group consisting of the hydrogen atom, the methyl-, ethyl-, phenethyl-, aminoethyl-, cyanoethyl-, hydroxyethyl-, hydroxypropyl-, acetyl-, and —$COOC_2H_5$ radicals, continuing said reaction until said product being prepared has a hydroxypropyl M.S. of at least 2 and an aminoalkyl M.S. of about 0.01–3.0, the alkali/cellulose ratio being 0.02–5.0.

11. The reaction product of claim 1 wherein the hydroxypropyl M.S. is about 3–5 and the aminoalkyl M.S. is about 0.05–1.0.

12. The reaction product of claim 2 wherein the hydroxypropyl M.S. is about 3–5 and the aminoalkyl M.S. is about 0.05–1.0.

13. Process of claim 10 wherein said reaction is continued until said product being prepared has a hydroxypropyl M.S. of about 3–5 and an aminoalkyl M.S. of about 0.05–1.0.

References Cited

UNITED STATES PATENTS

| | | | |
|---|---|---|---|
| 3,296,247 | 1/1967 | Klug | 260—231 |
| 2,972,606 | 2/1961 | Hartman et al. | 260—91.3 XR |
| 2,656,241 | 10/1953 | Drake et al. | 260—231 XR |

DONALD E. CZAJA, *Primary Examiner.*

R. W. MULCAHY, *Assistant Examiner.*

U.S. Cl. X.R.

106—197